United States Patent
Bourlinos et al.

(10) Patent No.: US 9,440,850 B2
(45) Date of Patent: Sep. 13, 2016

(54) CARBON MATERIAL FOR HYDROGEN STORAGE

(75) Inventors: Athanasios Bourlinos, Acharnon (GR); Theodore Steriotis, Pireas (GR); Athanasios Stubos, Neo Psychiko (GR); Michael A Miller, San Antonio, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 36 days.

(21) Appl. No.: 12/272,488

(22) Filed: Nov. 17, 2008

(65) Prior Publication Data

US 2010/0125038 A1    May 20, 2010

(51) Int. Cl.
    *B01J 20/20*   (2006.01)
    *C01B 3/00*    (2006.01)
    *B82Y 30/00*   (2011.01)

(52) U.S. Cl.
    CPC .............. *C01B 3/0021* (2013.01); *B82Y 30/00* (2013.01); *Y02E 60/325* (2013.01)

(58) Field of Classification Search
    CPC .... C01B 3/0021; B82Y 30/00; Y02E 60/325
    USPC ............ 423/648.1, 644, 447.1, 447.2, 447.5; 502/313, 330, 339
    See application file for complete search history.

(56) References Cited

U.S. PATENT DOCUMENTS

| | | | |
|---|---|---|---|
| 4,728,580 A * | 3/1988 | Grasselli et al. | 428/610 |
| 6,024,935 A * | 2/2000 | Mills et al. | 423/648.1 |
| 2004/0087441 A1* | 5/2004 | Bock et al. | 502/313 |

OTHER PUBLICATIONS

Lueking (Hydrogen spillover to enhance hyrogen storage-study of the effect of carbon physicochemical properties, Applied Catalysis A 2004, 265: 259-268).*
Lachawiec Jr (Hydrogen storage in Nanostructured carbons by spillover, Bridge-building enhancement, Langmuir 2005, 21, 11418-11424).*
Ono et al, Machine traslation of JP2007-250214.*
Machine translation of Kojima (JP2006-051473).*
English translation of of Ono (JP2007-250214), pubdate Sep. 27, 2007.*
Williams, et al., "The Power of Electron Paramagnetic Resonance Spectroscopy in Pharmaceutical Analysis," Spectroscopy Europe—Articles, vol. 18, No. 1 (2006); available at http://www.spectroscopyeurope.com/EPR_18_1.pdf.
Webmineral, "Potarite Mineral Data," available at http://webmineral.com/data/Potarite.shtml, retrieved on Oct. 30, 2008.
Li, et al., "Hydrogen Storage in Metal-Organic Frameworks by Bridged Hydrogen Spillover," J.Am.Chem.Soc. 2006, 128 (25), 8136-8137.

(Continued)

*Primary Examiner* — Jun Li
(74) *Attorney, Agent, or Firm* — Grossman, Tucker et al.

(57) ABSTRACT

The present invention relates to carbon based materials that are employed for hydrogen storage applications. The material may be described as the pyrolysis product of a molecular precursor such as a cyclic quinone compound. The pyrolysis product may then be combined with selected transition metal atoms which may be in nanoparticulate form, where the metals may be dispersed on the material surface. Such product may then provide for the reversible storage of hydrogen. The metallic nanoparticles may also be combined with a second metal as an alloy to further improve hydrogen storage performance.

6 Claims, 9 Drawing Sheets

(56) References Cited

OTHER PUBLICATIONS

Li, et al., "Significantly Enhanced Hydrogen Storage in Metal-Organic Frameworks via Spillover," J.Am.Chem.Soc., 2006, 128 (3), 726-727.

Lachawiec, et al., "Hydrogen Storage in Nanostructured Carbons by Spillover: Bridge-Building Enhancement," Langmuir, 2005, 21 (24), 11418-11424.

Yildirim, "Molecular and dissociative absorption of multiple hydrogen molecules on transition mental decorated C60," Physics Review B 72, 153403-1-4 (2005).

Durgun, et al., "Transition-Metal-Ethylene Complexes as High-Capacity Hydrogen-Storage Media," Physics Review Letters 97, 226102-1-4 (2006).

Centrone, et al., "Adsorption of H2 on carbon-based materials: A Roman spectroscopy study," Physics Review B 71, 245406-1-7 (2005).

Yildirim, et al., "Titanium-Decorated Carbon Nanotubes as a Potential High-Capacity Hydrogen Storage Medium," Physics Review Letters 94, 175501 (2005).

Bourlinos, et al., "Synthesis, characterization and gas sorption properties of a molecularly-derived graphite oxide-like foam," Elsevier Carbon 45 (2007) 852-857.

Fichtner, "Nanotechnological Aspects in Materials for Hydrogen Storage," Advanced Engineering Materials 2005, 7, No. 6, pp. 443-455.

Hirscher, et al., "Hydrogen Storage by Physisorption in Microporous Materials," Max-Planck-Institut fur Metallforschung.

Zacharia, et al., "Spillover of physisorbed hydrogen from sputter-deposited arrays of platinum nanoparticles to multi-walled carbon nanotubes," Chemical Physics Letters 434 (2007) 286-291.

Tebada, et al., "The Solid Solution of Mercury in Palladium," Shirt Communication, Acta Cryst. (1961), 41, 1299.

\* cited by examiner

US 9,440,850 B2

CARBON MATERIAL FOR HYDROGEN STORAGE

GOVERNMENT RIGHTS CLAUSE

This invention was made with U.S. Government support under Contract No. DE-FC36-02AL67619 awarded by the Department of Energy. The Government has certain rights in this invention.

FIELD OF THE INVENTION

The present invention relates to carbon based materials that are employed for hydrogen storage applications. The material may be described as the pyrolysis product of a molecular precursor such as a cyclic quinone compound. The pyrolysis product may then be combined with selected transition metal atoms which may be in nanoparticulate form, where the metals may be dispersed on the material surface. Such product may then provide for the reversible storage of hydrogen. The metallic nanoparticles may also be combined with a second metal or metal alloy to further improve hydrogen storage performance.

BACKGROUND OF THE INVENTION

The general requirements for improving hydrogen ($H_2$) storage within a solid medium include appropriate thermodynamics (favorable sorption-desorption enthalpies), relative fast kinetics (i.e. relative fast uptake and/or release), high storage capacity, effective heat transfer, high gravimetric and volumetric densities (e.g. relatively light in weight and conservative in space). Other desirable characteristics may include relatively long cycle lifetimes, adequate mechanical strength and durability. Solid storage (e.g. in metal hydrides) has shown some promise, but the demand for more efficient systems remains an on-going consideration. The U.S. Department of Energy has nonetheless established a multi-stage target for hydrogen storage capacity with respect to fuel cell applications. The targets for such hydrogen storage systems are about 4.5% by weight (wt.) by 2007, 6.0% (wt.) by 2009 and 9.0% (wt.) by 2015.

SUMMARY

In a first exemplary embodiment, the present disclosure relates to a method for forming a material for hydrogen storage by first supplying a cyclic quinone compound containing at least two ketone groups, wherein the quinone compound includes at least one metal alkoxide salt and optionally a halogen atom, wherein the quinone compound has a thermal degradation temperature. This may then be followed by pyrolyzing the cyclic quinone compound in air to a temperature that is within ±20° C. of the thermal degradation temperature to provide a pyrolysis product. This then may be followed by incorporating into the pyrolysis product metallic nanoparticles having a diameter of 1 nm to 100 nm wherein the metallic nanoparticles comprise one of Ti, V, Fe, Ni, Cu, Ru, Rh, Pd, Sn, Sb, W, Re, Pt, or Au. The pyrolysis product containing the metallic nanoparticles is capable of sorbing hydrogen at levels of 0.1 to 2.5 weight percent at temperatures of 20° C. to 30° C. at hydrogen pressures of 1-5 bars.

In a second exemplary embodiment, the present disclosure again relates to a method for forming a material for hydrogen storage by first supplying a cyclic quinone compound containing at least two ketone groups, wherein the quinone compound includes at least one metal alkoxide salt and optionally a halogen atom, wherein the quinone compound has a thermal degradation temperature. This may then be followed by pyrolyzing the cyclic quinone compound in air to a temperature that is within ±20° C. of the thermal degradation temperature to provide a pyrolysis product. This then may be followed by incorporating into the pyrolysis product metallic nanoparticles having a diameter of 1 nm to 100 nm wherein the metallic nanoparticles comprise one of Ti, V, Fe, Ni, Cu, Ru, Rh, Pd, Sn, Sb, W, Re, Pt, or Au in combination with a second metal or metals as an alloy selected from B, Al, V, Fe, Co, Ni, Cu, Zn, Ga, Zr, Nb, Mo, Ru, Rh, Pd, Ag, Cd, In, Sn, Sb, Hf, Ta, W, Re, Os, Ir, Pt, Au, Hg, Tl, Pb, or Bi. The pyrolysis product containing the metallic nanoparticles and the second metal is capable of sorbing hydrogen at levels of up to and including 10 percent by weight, at hydrogen pressures of 1-80 bars and temperatures of 20° C. to 30° C.

In a third exemplary embodiment, the present disclosure relates to a hydrogen storage material comprising a pyrolysis product of a cyclic quinone compound containing at least two ketone groups, wherein the quinone compound includes at least one metal alkoxide salt and optionally a halogen atom. Metallic nanoparticles are distributed in the pyrolysis product, the nanoparticles having a diameter of 1 nm to 100 nm wherein the metallic nanoparticles comprise one of Ti, V, Fe, Ni, Cu, Ru, Rh, Pd, Sn, Sb, W, Re, Pt, or Au. The pyrolysis product containing the metallic nanoparticles is capable of sorbing hydrogen at levels of 0.1 to 2.5 weight percent at temperatures of 20° C. to 30° C. at hydrogen pressures of 1-5 bars.

In a fourth exemplary embodiment, the present disclosure relates to a hydrogen storage material comprising a pyrolysis product of a cyclic quinone compound containing at least two ketone groups, wherein the quinone compound includes at least one metal alkoxide salt and optionally a halogen atom. The pyrolysis compound also includes metallic nanoparticles having a diameter of 1 nm to 100 nm wherein the metallic nanoparticles comprise one of Ti, V, Fe, Ni, Cu, Ru, Rh, Pd, Sn, Sb, W, Re, Pt, or Au, in combination with a second metal or metals as an alloy selected from B, Al, V, Fe, Co, Ni, Cu, Zn, Ga, Zr, Nb, Mo, Ru, Rh, Pd, Ag, Cd, In, Sn, Sb, Hf, Ta, W, Re, Os, Ir, Pt, Au, Hg, Tl, Pb, or Bi. The pyrolysis product containing the metallic nanoparticles is capable of sorbing hydrogen at levels of up to and including 10 percent by weight, at hydrogen pressures of 1-80 bars and temperatures of 20° C. to 30° C.

BRIEF DESCRIPTION OF THE DRAWINGS

Various features and advantages of the present disclosure may be better understood by reading the following detailed description, taken together with the drawings wherein.

DETAILED DESCRIPTION

The present disclosure is directed at the use of a graphite oxide-like derivative for hydrogen storage that may be derived from a graphite oxide-like precursor, which precursor may specifically amount to a metallic salt of a cyclic quinone ring compound. That is, one may utilize a cyclic ring compound, containing at least two ketone groups within the ring structure, which ring structure also includes one or more alkoxide metal salt functionalities. The cyclic quinone ring may optionally include one or more halogen atoms. For example, one may utilize the following compound

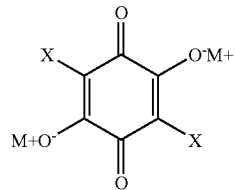

wherein X may be a halogen (e.g. Cl or Br) and $M^+$ is reference to a metal cation, which may include, e.g., $Na^+$, $Li^+$ or $K^+$. As can be seen from the above, the cyclic quinone ring compound as illustrated contains two alkoxide salt functionalities (—C—$O^-M^+$) on the indicated quinone ring structure In addition, while a 6-membered ring is specifically illustrated above, it should be understood that the present disclosure applies to other types of quinone ring compounds, such as an 8-membered quinone ring. In addition, it is contemplated herein that one may also utilize fused ring quinones, e.g., quinones of the formula:

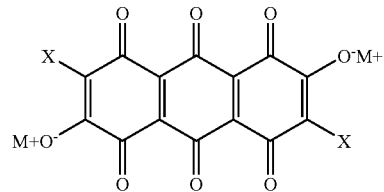

Moreover, it should be noted that the number of fused quinone rings, while illustrated above at 3, may include fused ring quinone ring structures with ring numbers of 2 to 6. It may therefore now be noted that in a particular preferred embodiment, the cyclic quinone compound suitable for use as the graphite oxide-like precursor herein may have the following particular structure:

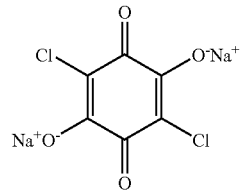

which may also be recognized as the chloroanilate disodium salt of hydroquinione, with an empirical formula $C_6Cl_2Na_2O_4$.

It may then be noted that pyrolysis (heating) in air of the cyclic quinone salts, at temperatures that are at or within ±20° C. of the salt decomposition temperature, which in the case of the chloroanilate disodium salt, is about 290° C., will provide a graphite oxide-like material which then uniquely serves as the platform substrate for incorporation of various metals to provide for hydrogen storage capability. Accordingly, the decomposition temperature herein may be understood as that temperature where the cyclic quinone ring and/or the substituents covalently attached thereto undergo bond breaking and reformation. That is, upon pyrolysis, a graphite oxide-like product may be formed, which typically contains relatively small regions of graphene layers, thereby providing porosity, where a graphene layer may be understood as a single layer of graphite structure. A graphite structure herein is understood as multiple layers of hexagonally configured carbon atoms. In addition, functional groups such as —COOH, —C=O and —OH may be individually or collectively observed at the periphery of the layers.

Figure 1:
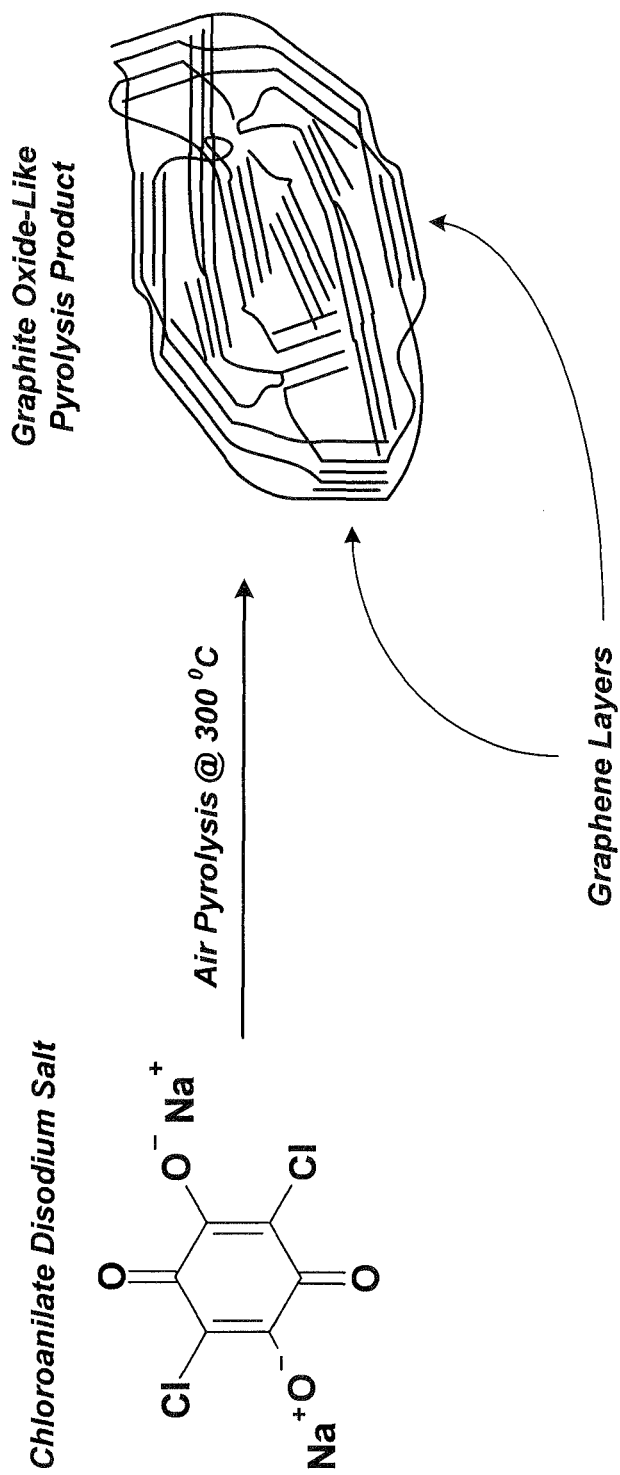
FIG. 1 illustrates the air pyrolysis of sodium chloroanilate, otherwise known as 2,5-dichloro-3,6 dihydroxy-p-benzoquinone disodium salt, to provide a graphite oxide-like product which contains graphene layers.

FIG. 1 sets forth one general sequence for conversion of the preferred cyclic quinone compound, the chloroanilate disodium salt of hydroquinone, to the graphite oxide-like structure herein containing the illustrated bundles of graphene layers (which may also be understood as lamellae phase crystallites). Accordingly, in the case of the chloroanilate disodium salt of hydroquinone, pyrolysis may be carried out at a temperature of 300° C. in air for a period of about 2.0 hours and the obtained graphite oxide-like material may then be washed with water and an organic solvent (e.g. acetone) and dried for about 24 hours at 65° C.

Aside from the above, it is to be noted that the preferred technique to describe the pyrolysis products of cyclic quinone compound herein, is to do so with a consideration of the following characteristic parameters, as the assignment of a precise empirical compositional formula is currently considered to be relatively difficult and may fall short of properly describing the actual pyrolysis reaction product. Accordingly, the pyrolysis product of the cyclic quinone compound may be effectively characterized as one having a BET surface area in the range of 250 m$^2$/g to 2500 m$^2$/g, including all values and increments, at a variation of 1.0 m$^2$/g. For example, the BET surface area may be about 400 m$^2$/g to 600 m$^2$/g. One particularly useful BET surface area was found to be about 510 m$^2$/g. In addition, the pyrolysis product of the cyclic quinone compounds herein may be further defined as having a pore volume of 0.40 to 4.50 cm$^3$/g, including all values and increments therein, at 0.1 cm$^3$/g variation and a percent porosity of 30% to 99%. Furthermore, via electron paramagnetic resonance (EPR) analysis it was determined that the pyrolysis product of the cyclic quinone compounds herein had 90% or more of the EPR signal indicating the presence of unshared electrons (free radicals).

Figure 2:
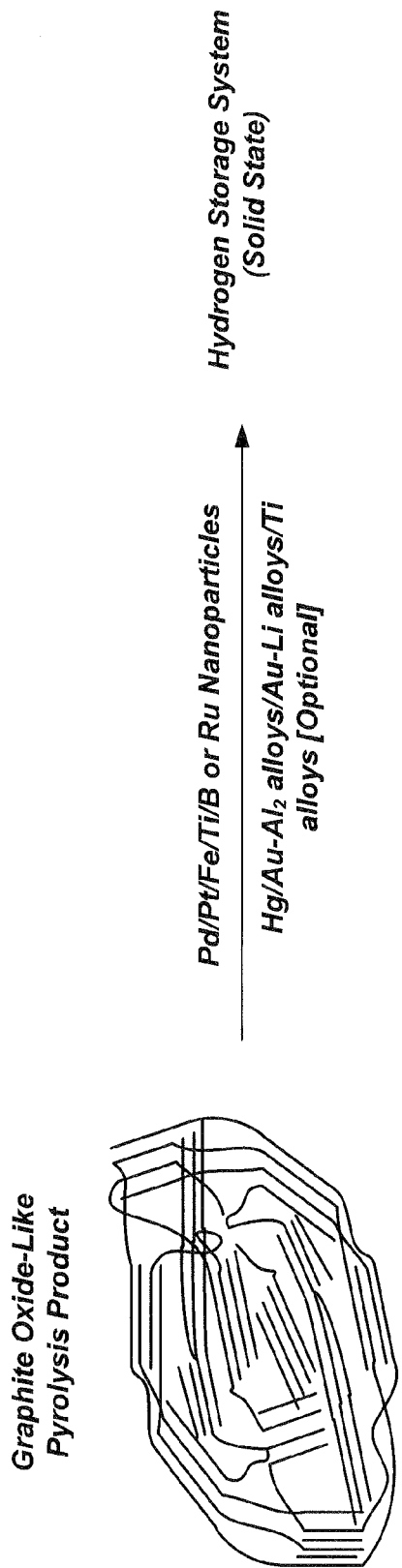
FIG. 2 illustrates the general scheme for incorporating metallic nanoparticles, optionally with a second metal component, in the pyrolysis product of a cyclic quinone compound.

The pyrolysis product of the cyclic quinone compounds may then be combined with a first metal component, such as metallic nanoparticles. See FIG. 2. In particular, the metallic nanoparticles may be configured such that they are dispersed on the surface of the pyrolysis product of the chloroanilate disodium salt. Suitable metallic nanoparticles may include Ti, V, Fe, Ni, Cu, Ru, Rh, Pd, Sn, Sb, W, Re, Pt, and/or Au. The nanoparticles may also be specifically incorporated into the exemplary chloroanilate disodium salt pyrolysis product in combination with a second metal or metals, as an alloy selected from B, Al, V, Fe, Co, Ni, Cu, Zn, Ga, Zr, Nb, Mo, Ru, Rh, Pd, Ag, Cd, In, Sn, Sb, Hf, Ta, W, Re, Os, Ir, Pt, Au, Hg, Tl, Pb, and/or Bi. The metallic nanoparticles (e.g. Pd or Pt) may therefore be initially present at a size of 1 nm to 100 nm, including all values and increments therein, in 1 nm variation. The level of metallic nanoparticles, either alone or in combination with a second metal or metals, which for incorporation into the chloroanilate disodium salt graphite oxide pyrolysis product, may be in the range of 5 percent by weight to 25 percent by weight, including all values and increments therein, at 1.0 percent by weight variation. Furthermore, the relative ratio of the metallic nanoparticles to the second metal or metals may be at a level of 10:1 to 1:10. For example, one may utilize 10 parts of Pd to 1 part of Hg, and vice versa.

It has been found that the use of the chloroanilate disodium salt pyrolysis product, in combination with, e.g. a nanoparticle of Pd, sorbs up to about 2.1 weight percent of hydrogen at room temperature and at hydrogen pressures of about 3 bar. In addition, such sorption of hydrogen may be readily released by desorption in which case the system provides a storage and release medium for delivery of hydrogen. Accordingly, in the broad context of the present disclosure, it may be appreciated that one may provide the pyrolysis product of a cyclic quinone ring compound, incorporate one or more of the metallic elements Ti, V, Fe, Ni, Cu, Ru, Rh, Pd, Sn, Sb, W, Re, Pt, and/or Au in nanoparticle form (1 nm to 100 nm), which then provides for the ability to releasably sorb hydrogen (H$_2$) at levels of 0.1-2.5 weight percent, at temperatures of 20° C. to 30° C., and at hydrogen pressures of 1-5 bars. In addition, upon desorption, the pyrolysis product containing the indicated metallic nanoparticles is in effect regenerated so that it may be repeatedly cycled for the corresponding release of hydrogen as may be contemplated for a particular "hydrogen-on-demand" application.

However, quite apart from the above hydrogen storage capability, it was next established that by alloying, e.g. Pd, with a second metal as noted above (e.g. Hg), followed again by combination with a pyrolysis product of a cyclic quinone ring compound, one provided what appears to be another entirely new metal-carbon system, indicating hydrogen storage values at levels of at least 8.0-10.0 percent by weight at room temperature and hydrogen pressures of up to and including 80 bars. Accordingly, in the broad context of the present disclosure, the pyrolysis products herein, combined with one or more metallic nanoparticles selected from the group consisting of Ti, V, Fe, Ni, Cu, Ru, Rh, Pd, Sn, Sb, W, Re, Pt, and/or Au, in combination with a second metal or metals as an alloy selected from the group consisting of B, Al, V, Fe, Co, Ni, Cu, Zn, Ga, Zr, Nb, Mo, Ru, Rh, Pd, Ag, Cd, In, Sn, Sb, Hf, Ta, W, Re, Os, Ir, Pt, Au, Hg, Tl, Pb, and/or Bi, can provide for the reversible sorption and desorption of hydrogen, at levels between 0.1 percent to 10 percent by weight, at hydrogen pressures of 1-80 bars, at temperatures of 20° C. to 30° C.

Reflecting back upon the earlier discussion regarding DOE targets, it should be immediately apparent that such metal-carbon system herein already exceeds the DOE target of providing a solid material storage composition of hydrogen of 6.0 weight percent by 2008, and is nearly close to the DOE target of 9.0 percent by weight for 2009. That being the case, it may be appreciated that the metal-carbon system herein may provide for a relatively low-cost solid state hydrogen uptake with hydrogen uptake values for a solid phase system that may now satisfy requirements for use within the transportation industry.

Figure 3:
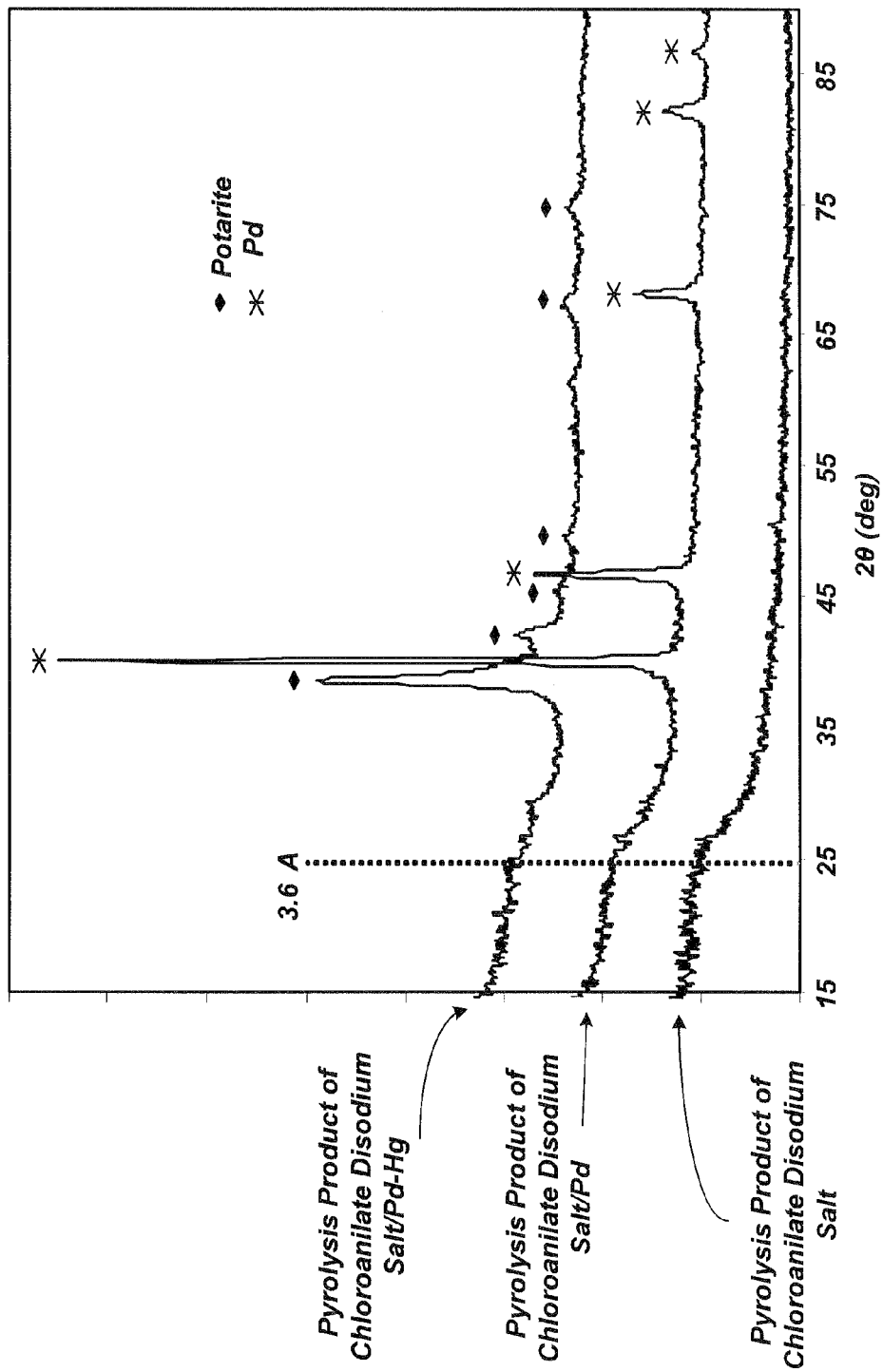
FIG. 3 provides X-ray diffraction data for the pyrolysis product of chloroanilate disodium salt, the pyrolysis product of chloroanilate disodium salt in combination with Pd nanoparticles (~10 nm), and the pyrolysis product of chloroanilate disodium salt in combination with Pd nanoparticles (~10 nm) in combination with Hg (Pd—Hg).

Attention is next directed to FIG. 3, which provides the X-ray diffraction data for the pyrolysis product of chloroanilate disodium salt, the pyrolysis product of chloroanilate disodium salt in combination with Pd nanoparticles (~10 nm), and the pyrolysis product of chloroanilate disodium salt in combination of Pd nanoparticles (~10 nm) in combination with Hg (Pd—Hg). As can be seen, the pattern of the pyrolysis product of chloroanilate disodium salt in combination with Pd nanoparticles shows relatively sharp reflections apparently due to the presence of the Pd nanoparticles on the underlying graphite oxide-like substrate. The pyrolysis product of chloroanilate disodium salt in combination with Pd nanoparticles with Hg showed identical structure to the mineral potarite (Pd—Hg), which contains about 65.34 weight percent Hg and about 34.66 weight percent Pd. Reference herein to nanoparticles of ~10 nm is reference to the feature that the nanoparticle size may vary +/−2 nm for a given sample.

Figure 4:
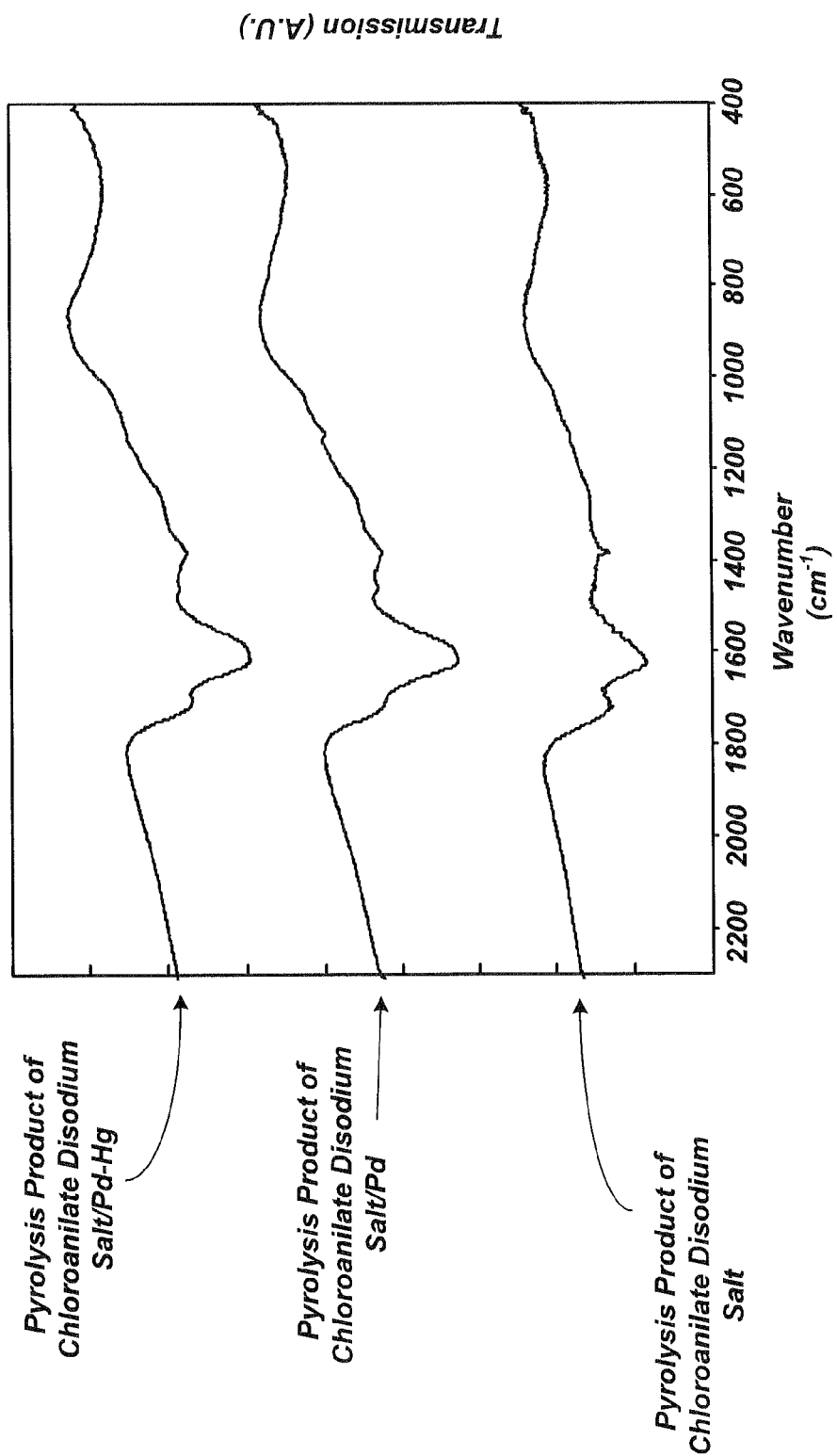
FIG. 4 provides infrared (IR) spectra of the pyrolysis product of chloroanilate disodium salt, the pyrolysis product of chloroanilate disodium salt in combination with Pd nanoparticles (~10 nm), and the pyrolysis product of chloroanilate disodium salt in combination with Pd nanoparticles (~10 nm) in combination with Hg (Pd—Hg).
Figure 5B:
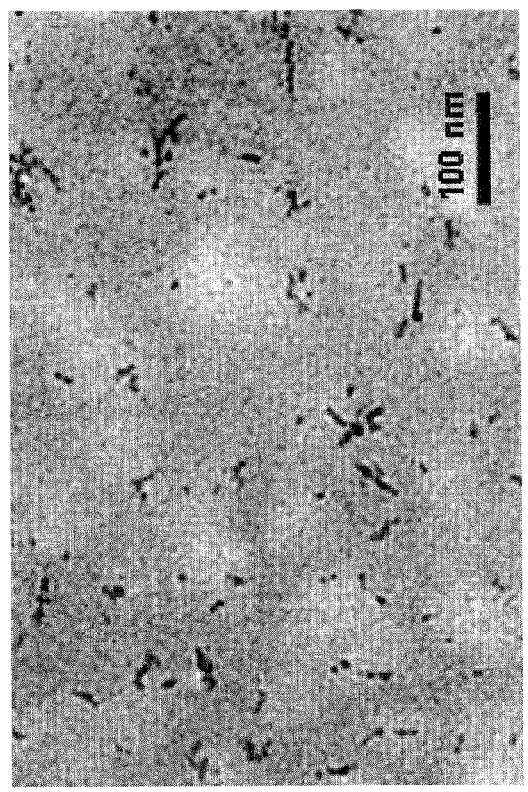
FIG. 5B provides the high resolution transmission electron micrograph of the pyrolysis product of chloroanilate disodium salt in combination with Pd nanoparticles (~10 nm).
Figure 5A:
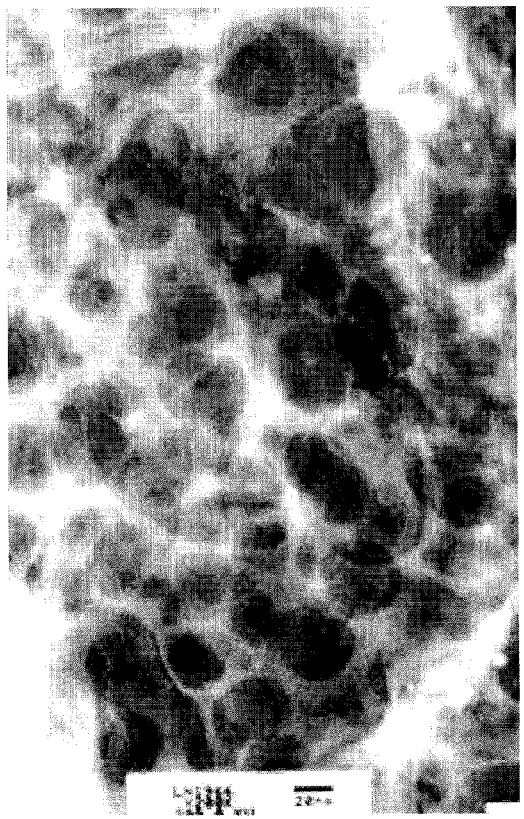
FIG. 5A provides a high resolution transmission electron micrograph and the electron diffraction patterns (insert) of the pyrolysis product of a chloroanilate disodium salt.
Figure 5C:
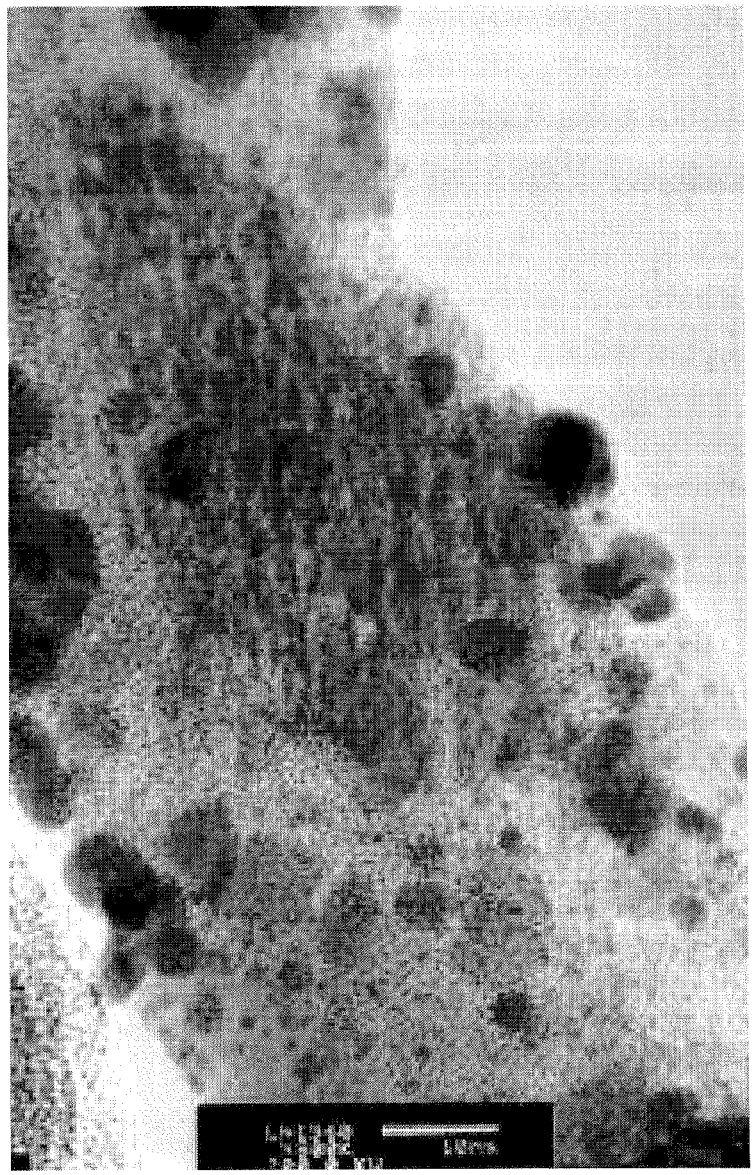
FIG. 5C provides the high resolution electron micrograph of the pyrolysis product of chloroanilate disodium salt in combination with Pd nanoparticles (~10 nm) in combination with Hg (Pd—Hg).

Attention is next directed to FIG. 4, which provides infrared spectra (IR) of the pyrolysis product of the chloroanilate disodium salt, the pyrolysis product of the chloroanilate disodium salt including Pd nanoparticles (~10 nm in diameter), and the pyrolysis product of chloroanilate disodium salt in combination of Pd nanoparticles (~10 nm in diameter) in combination with Hg (Pd—Hg). As can be seen, the Pd and Pd—Hg samples retain the characteristics of the underlying pyrolysis product, exhibiting characteristic carbonyl absorption at 1710 cm$^{-1}$ and also relatively broad absorptions at 1500-1100 cm$^{-1}$ and 600 cm$^{-1}$, indicating the presence of hydroxyl (—OH) functionality. FIG. 5A provides a high resolution transmission electron micrograph image and the electron diffraction patterns (insert to FIG. 5A) of the pyrolysis product of the chloroanilate salt. The image has been inverted for clarity (i.e. the carbon matrix is shown in white). FIG. 5B provides the high resolution transmission electron micrograph of the pyrolysis product of the chloroanilate salt which contains the Pd nanoparticles (~10 nm in diameter), showing aggregates of Pd nanoparticles, as well as single Pd nanoparticles dispersed therein. FIG. 5C provides the high resolution transmission electron micrograph of the pyrolysis product of chloroanilate disodium salt in combination with Pd nanoparticles with Hg.

Figure 6:
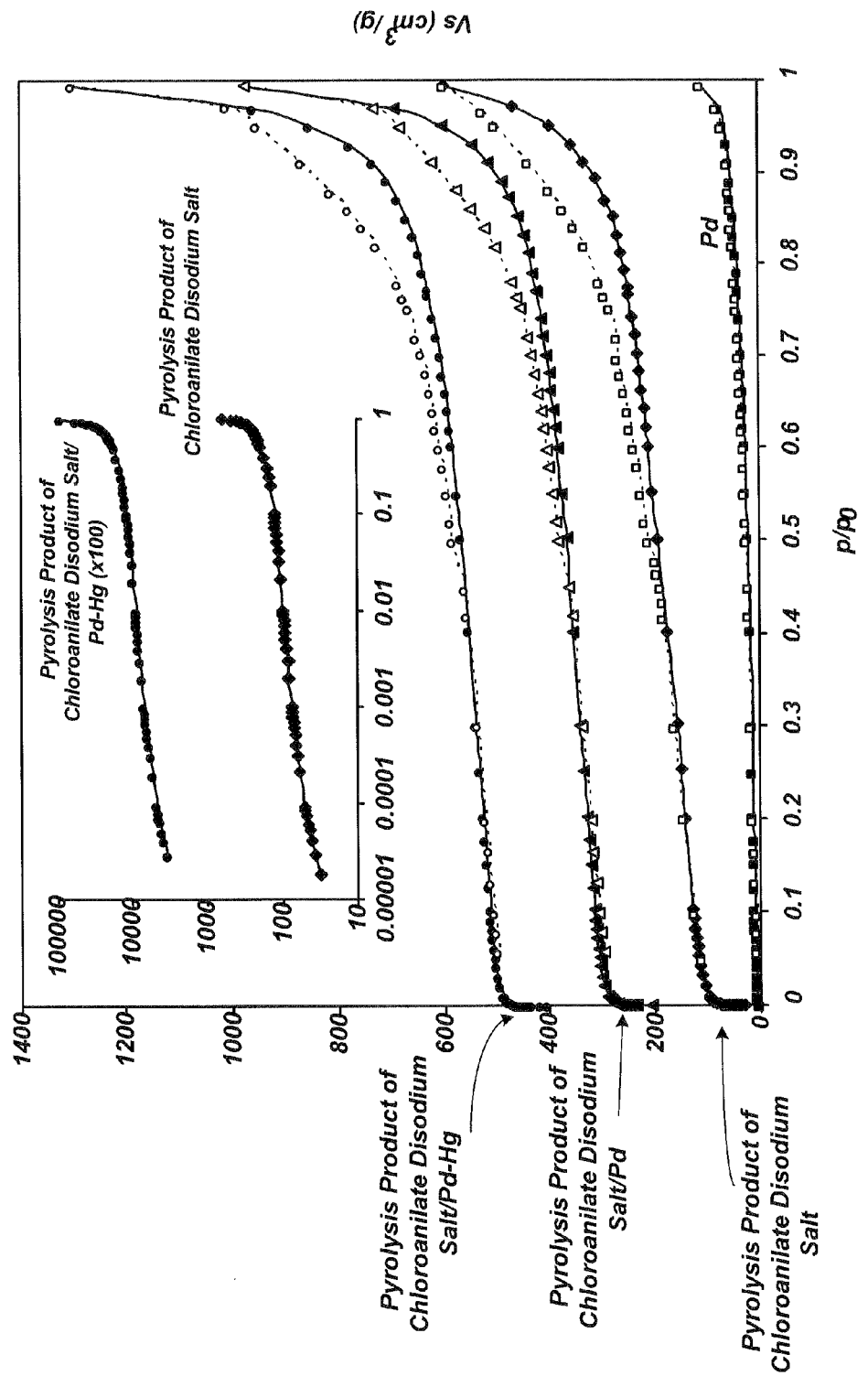
FIG. 6 illustrates the $N_2$ sorption/desorption isotherms at 77° K of: (a) Pd nanoparticles (~10 nm); (b) the pyrolysis product of a choloroanilate disodium salt; (c) the pyrolysis product of chloroanilate disodium salt in combination with Pd nanoparticles (~10 nm); (d) the pyrolysis product of chloroanilate disodium salt in combination with Pd nanoparticles (~10 nm) in combination with Hg (Pd—Hg).

Attention is next directed to FIG. 6, which illustrates the $N_2$ sorption/desorption isotherms at 77° K of Pd nanoparticles (~10 nm in diameter), the pyrolysis product of the chloroanilate salt, the pyrolysis product of the chloroanilate disodium salt which contains the Pd nanoparticles (~10 nm in diameter) and the pyrolysis product of chloroanilate disodium salt in combination with Pd—Hg nanoparticles. For all sorption/desorption plots herein (FIGS. 6-8), it can be noted that the darkened symbols represent sorption and the hollow symbols represent desorption. The insert graph illustrates the sorption isotherms in log scale. In the normal scale the isotherms have been shifted for clarity by 200 cm³/g for the chloroanilate salt which contains the Pd nanoparticles (~10 nm in diameter) and 400 cm³/g for the pyrolysis product of chloroanilate disodium salt in combination with Pd—Hg nanoparticles (~10 nm in diameter). As can be seen, due to the porosity of the pyrolysis product, the $N_2$ isotherms (aside from that for Pd alone) are all relatively similar and indicative of a multi-scale pore system spanning from micropores (i.e. pores with sizes less than 2 nm) indicating a relatively steep increase in the amount sorbed at relatively low pressures, $p/p_0$, to mesopores (i.e. pores of 2 nm to 50 nm) and indicating a hysteresis loop, to macropores (i.e. pores greater than 50 nm) and indicating an exponential increase of amount of $N_2$ sorbed where $p/p_0$ approaches the value of 1.0, and more specifically, is in the range of 0.90-1.0. Reference to "p" is the pressure of the applied nitrogen, and "$p_0$" is the pressure at saturation.

In such regard, it may therefore be appreciated herein that the addition of metallic nanoparticles, or the addition of the metallic nanoparticles in combination with a second metal (e.g. Hg) as disclosed herein, can be uniquely achieved without affecting the porosity of the pyrolysis products of the metallic salts of the cyclic quinone ring compound with respect to gas transport. That is, the porosity of the pyrolysis products remains undisturbed and the ability to efficiently interact with a gas due to diffusion and transport of the gas within the porous regions of the pyrolysis products is not compromised.

It is worth noting that the similarity of the isotherms (aside from that for Pd alone) appears to be the case for the entire pressure range ($10^{-5}$ to 1.0), indicating that the samples share the same pore system in all length scales. The BET surface areas for the samples in FIG. 6 were 510 m²/g for the pyrolysis product of the chloroanilate salt and 450-460 m²/g for the pyrolysis product treated either with Pd alone or with the Pd—Hg combination. With respect to the ~10 nm diameter Pd nanoparticles on their own, such particles indicated a BET surface area of about 43 m²/g. It may therefore be appreciated that at a 10 percent by weight loading of the Pd nanoparticles and/or Pd—Hg nanoparticle combination, the value for the Pd nanoparticles on their own is consistent with the slight surface area decrease observed when the Pd nanoparticles and/or Pd—Hg nanoparticles combination is added to the pyrolysis products (0.90×510 m²/g)+(0.10×43 m²/g)=460 m²/g. This therefore suggests that no intercalcation or insertion of the nanoparticles into the matrix of the pyrolysis products had occurred.

It is therefore worth noting at this point that the pyrolysis products of a cyclic quinone ring compound allows for the incorporation and dispersion of either the above referenced metallic nanoparticles (Ti, V, Fe, Ni, Cu, Ru, Rh, Pd, Sn, Sb, W, Re, Pt, and/or Au) and/or the nanoparticles combined with a second metal or metals as an alloy (B, Al, V, Fe, Co, Ni, Cu, Zn, Ga, Zr, Nb, Mo, Ru, Rh, Pd, Ag, Cd, In, Sn, Sb, Hf, Ta, W, Re, Os, Ir, Pt, Au, Hg, Tl, Pb, and/or Bi) to provide an improved solid form hydrogen storage system. In addition, such hydrogen storage system is one wherein the various characteristics of the pyrolysis products, noted herein, remain relatively unchanged.

Figure 7:
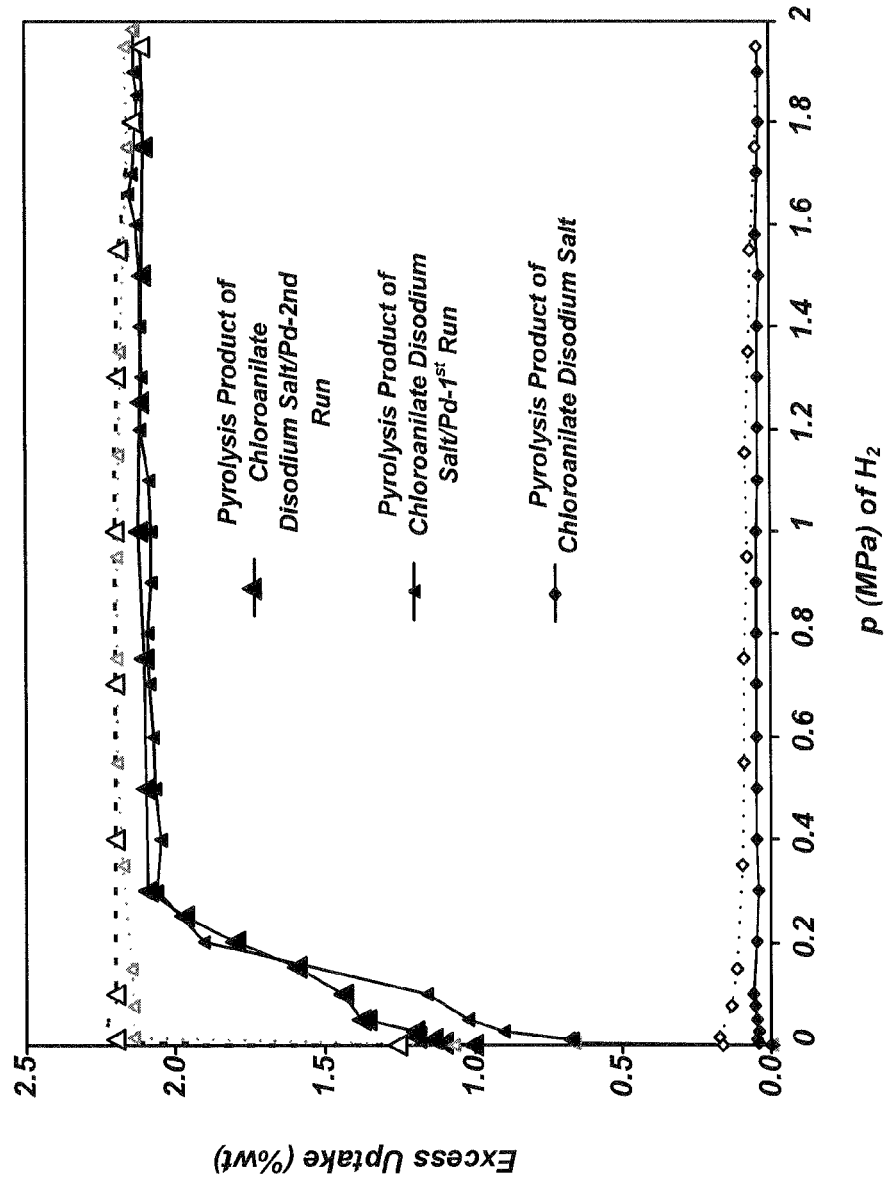
FIG. 7 provides the hydrogen sorption isothermal measurements at room temperature (298° K) for the pyrolysis product of a chloroanilate disodium salt and for such salt in combination with Pd nanoparticles (~10 nm).

FIG. 7 shows the hydrogen sorption isothermal measurements at room temperature (298° K) for the pyrolysis product of the chloroanilate disodium salt and for such salt in combination with Pd. As can be seen, the amount of hydrogen sorbed on the pyrolysis product in the absence of the Pd (darkened symbols) is relatively small. However, as can be seen, addition of Pd to the pyrolysis product results in a marked improvement in the sorption of hydrogen. The amount sorbed in this particular example was about 2.1 percent by weight at the relatively low pressure of 3 bars (0.3 MPa) of hydrogen, at the temperature of 298° K. It therefore may be noted that the storage capacity of Pd is only about 0.72 percent by weight hydrogen, and in FIG. 7, the amount of Pd in the pyrolysis product is about 10% by weight. That being the case, it can be appreciated that the relatively high capacity noted of about 2.1 percent by weight hydrogen storage in the pyrolysis product is due to some sort of synergistic effect of the Pd nanoparticles when incorporated into the pyrolysis product as noted herein.

Figure 8:
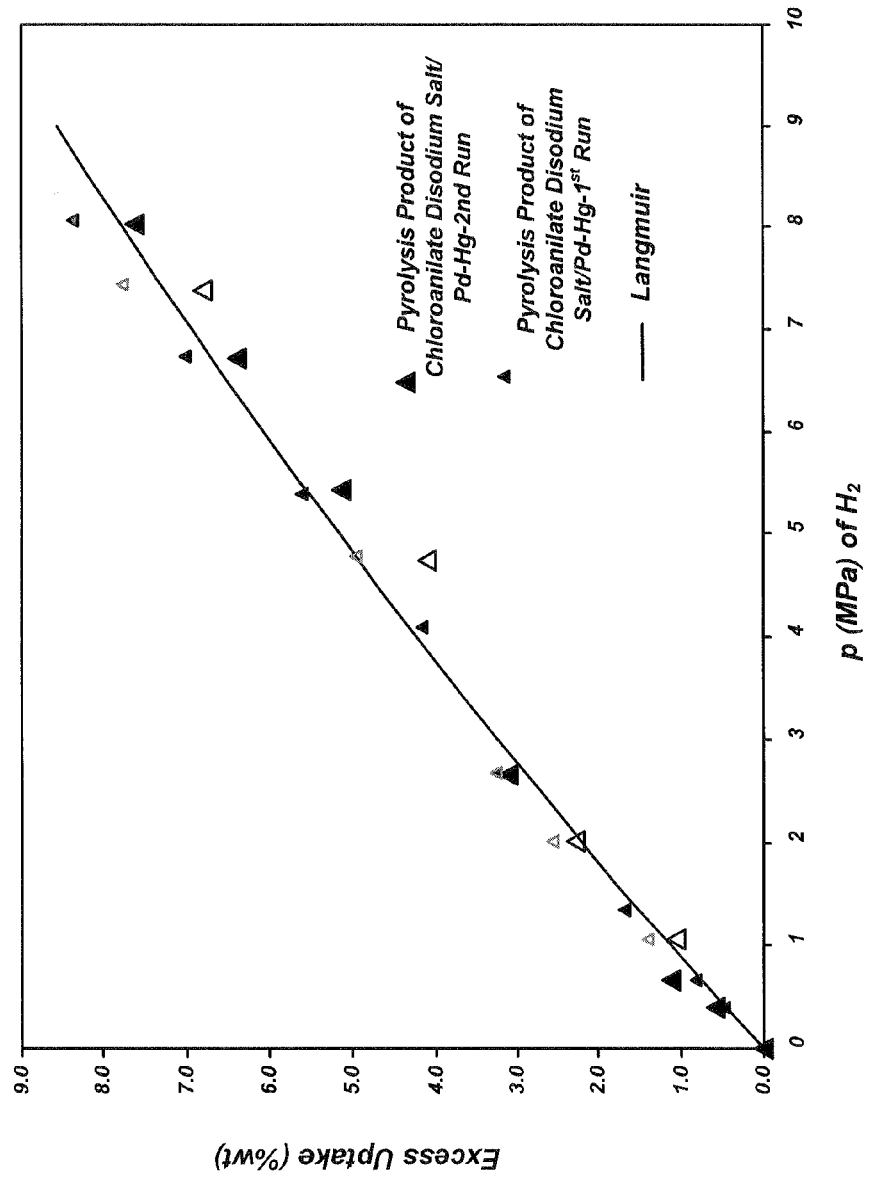
FIG. 8 indicates the sorption isothermal measurements at room temperature (298° K.) for the pyrolysis product of the chloroanilate disodium salt in combination with Pd—Hg, where the Pd is present at 80% by weight, Hg at 20% by weight, with respect to the pyrolysis product of the chloroanilate disodium salt.

Attention is next directed to FIG. 8, which indicates the sorption isothermal measurements at room temperature (298° K) for the pyrolysis product of the chloroanilate disodium salt in combination with Pd—Hg, where the Pd was present at 80% (atoms) and the Hg was present at 20% (atoms). The isotherms indicate a practically linear shape revealing an uptake of around 8.0 percent by weight hydrogen at about 8 MPa (80 bars). In addition, a Langmuir fit of the equilibrium points (solid line) predicts an excess of more than 9.0% by weight hydrogen absorption at about 10 MPa hydrogen. As noted above, this complies with DOE targets for a solid state hydrogen sorption system for year 2010. Furthermore, as can be seen, the isotherms are reversible (solid symbols indicating sorption and open symbols indicating desorption).

Attention is next directed to the following non-limiting examples describing the specific formation of the pyrolysis product of the chloroanilate halogen salt, and the procedures for incorporation of metallic nanoparticles, optionally in combination with a second metallic component.

Pyrolysis of a Cyclic Quinone (Chloroanilate Disodium Salt) to a Graphite Oxide-Like Material Chloranilic acid, disodium salt dihydrate was calcined at 300° C. in air for 2 hours. The obtained graphite oxide-like material was copiously washed with water and acetone prior drying at 65° C. for a day.[9]

Pyrolysis Product of Chloroanilate Disodium Salt in Combination with Palladium

The pyrolysis product of choloroanilate disodium salt was combined with 10% w/w Pd and was derived as follows: 130 mg of the pyrolysis product of the chloroanilate disodium salt (hereinafter support) was suspended in 25 mL de-ionized water followed by the addition of 25 mg anhydrous PdCl$_2$. The dissolution of the salt and subsequent coordination of the Pd(II) species to the surface exposed functional groups of the support was promoted by mild heating at 65° C. and by occasional sonication in an ultrasound bath. Then 50 mg NaBH$_4$ were added and the mixture was stirred for 1 h. The solid suspension was centrifuged, washed thoroughly with water and acetone and dried.

Pyrolysis Product of Chloroanilate Disodium Salt in Combination with Palladium/Mercury The solid phase hydrogen storage material containing the Pd nanoparticles in combination with mercury (12 w/w %, Pd/Hg=4 atomic ratio, potarite phase) was prepared by suspending 140 mg of the pyrolysis product of the chloroanilate salt in 25 ml de-ionized water followed by the dissolution of 25 mg anhydrous PdCl$_2$ and 9.5 mg HgCl$_2$. Salt dissolution was assisted by mild heating at 65° C. and sporadic sonication. Then 50 mg NaBH$_4$ were added and the mixture was stirred for 1 h. The solid suspension was centrifuged, washed thoroughly with water and acetone and dried.

The foregoing description of several methods and embodiments has been presented for purposes of illustration. It is not intended to be exhaustive or to limit the claims to the precise steps and/or forms disclosed, and obviously many modifications and variations are possible in light of the above teaching. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. It is intended that the scope of the invention be defined by the claims appended hereto.

What is claimed is:

1. A method for forming a material for releasably storing hydrogen comprising:

supplying a cyclic quinone compound containing at least two ketone groups, wherein said quinone compound includes at least one metal alkoxide salt and optionally a halogen atom, wherein said quinone compound has a thermal degradation temperature;

pyrolyzing said cyclic quinone compound in air to a temperature that is within +/−20° C. of said thermal degradation temperature to provide a porous graphite oxide product comprising regions of graphene structure having multiple layers of hexagonally configured carbon atoms and one or more of the functional groups —COOH, —C=O and —OH and wherein said porous graphite oxide product has a BET surface area of 600 m$^2$/g to 2500 m$^2$/g;

incorporating metallic nanoparticles on a surface of said porous graphite oxide product, said metallic nanoparticles having a diameter of 1 nm to 100 nm and wherein said metallic nanoparticles consist essentially of an alloy of Pd and Hg having a ratio of Pd:Hg selected from 1:10 to 10:1 by weight;

wherein a porosity of the porous graphite oxide product remains undisturbed and an ability to interact with a gas due to diffusion and transport of the gas within porous regions of the porous graphite oxide product is not compromised due to the metallic nanoparticles;

wherein said porous graphite oxide product containing said metallic nanoparticles sorbs and desorbs hydrogen at levels of 8.0 to 10.0 percent by weight, at hydrogen pressures of 1-80 bars and isothermal temperatures selected from 20° C. to 30° C.; and wherein the metallic nanoparticles are incorporated into said porous graphite oxide product at a level of 5 percent by weight to 25 percent by weight.

2. The method of claim 1 wherein said cyclic quinone compound has the following formula:

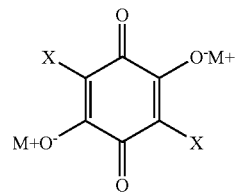

where X is a halogen and M$^+$ is a metal cation.

3. The method of claim 1 wherein said cyclic quinone compound has the following formula:

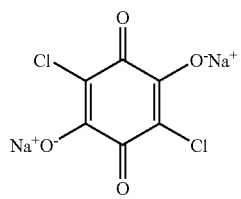

4. The method of claim 1 wherein said porous graphite oxide product has a pore volume of 0.40 to 4.50 cm$^3$/g.

5. The method of claim 1 comprising pyrolyzing of said quinone compound in air at a temperature of 270° C. to 310° C.

6. The method of claim 1, wherein the metallic nanoparticles comprises an alloy of Pd:Hg at an atomic ratio of 4:1.

* * * * *